(No Model.)

G. A. BURWELL.
BICYCLE.

No. 467,914. Patented Feb. 2, 1892.

Witnesses.
John F. Nelson
Jas. J. Maloney

Inventor.
George A. Burwell,
by Jos. P. Livermore
Att'y

UNITED STATES PATENT OFFICE.

GEORGE A. BURWELL, OF HIGHLANDVILLE, MASSACHUSETTS.

BICYCLE.

SPECIFICATION forming part of Letters Patent No. 467,914, dated February 2, 1892.

Application filed August 20, 1891. Serial No. 403,158. (No model.)

*To all whom it may concern:*

Be known that I, GEORGE A. BURWELL, of Highlandville, county of Norfolk, State of Massachusetts, have invented an Improvement in Bicycles, of which the following description, in connection with the accompanying drawings, is a specification, like letters on the drawings representing like parts.

My invention relates especially to the construction of the bearings of bicycle-wheels and to the appliances for adjusting the tension of the chain on Safety bicycles.

The invention consists, partly, in novel features of construction of the ball-bearings by which dust is excluded from the bearing-surfaces and by which the balls may be retained in the outer bearing when the inner bearing is removed, but may be removed from the outer bearing if required.

Figure 1:
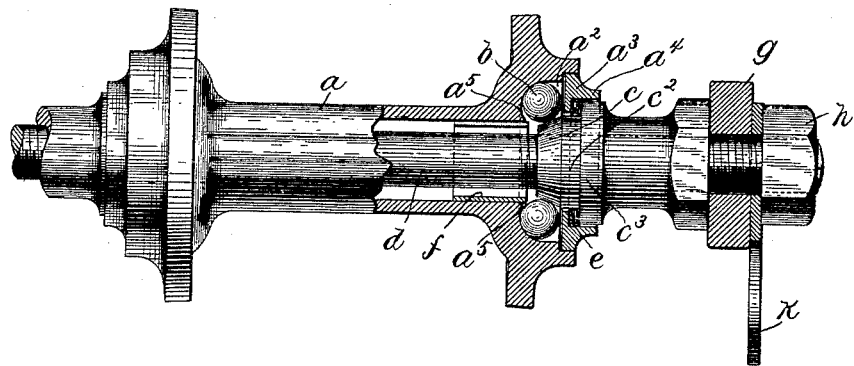
Figure 2:
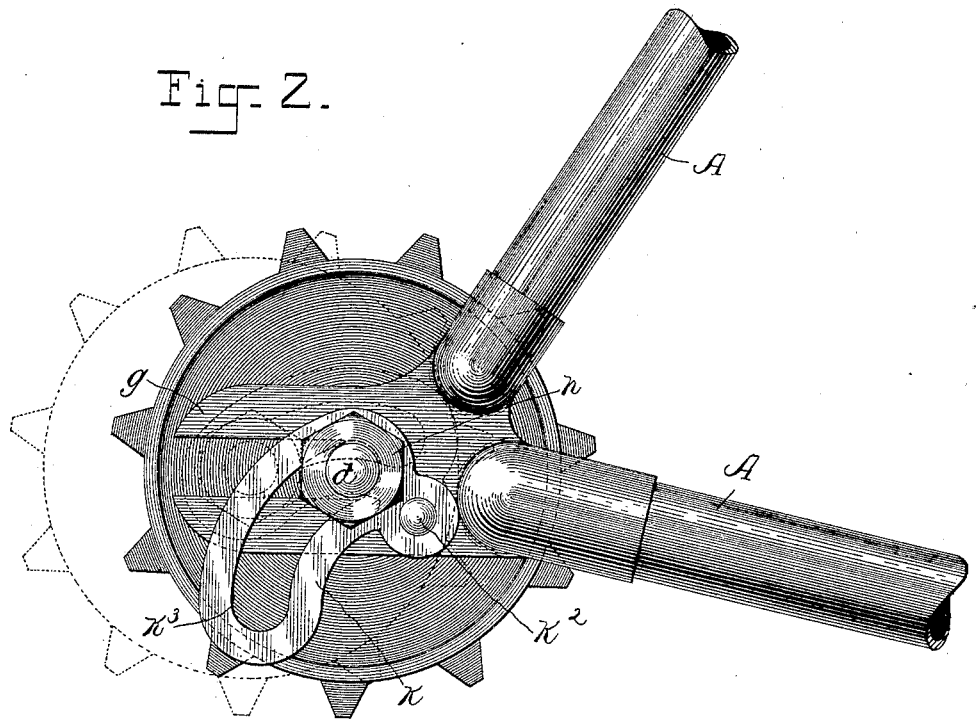

Figure 1 is a longitudinal section of a portion of a wheel-hub and bearing embodying this invention, and Fig. 2 a side elevation thereof, showing also a portion of the frame-work of a bicycle and the devices for governing the position of the wheel-hub and sprocket with relation to the said frame for the purpose of keeping the driving-chain at the proper tension.

The wheel-hub $a$ (see Fig. 1) may be of usual construction, being provided with a recess $a^2$ at its end to receive the balls $b$, which recess constitutes the outer bearing for said balls, the inner bearing of which is on a cone $c$, adjustable in the usual manner on a spindle $d$, so as to bring the inner and outer bearing-surfaces into proper engagement with the balls to cause the bearing to run freely and without looseness, said spindle $b$ passing through the wheel-hub $a$, which is tubular for that purpose. The outer end of the bearing-recess $a^2$ in the hub is closed by a disk or washer $a^3$, which is preferably driven tightly into the hub after the balls are introduced into the recess $a^2$ and serves to cover and protect the balls. Prior to this invention a plain disk or washer was commonly used in bearings of this kind to close the outer end of the hub over the balls, and the present invention consists, partly, in providing the said disk $a^3$ with an outwardly-projecting tubular portion $a^4$, which incloses a portion of the cone-piece $c$, as shown. In other words, the disk that confines the balls in the hub is provided with an annular recess or rabbet at its outer end.

The cone-piece $c$ is provided just outside the cone with a cylindrical portion $c^2$ and beyond with a shoulder $c^3$, which fits loosely within the tubular portion $a^4$ of the ball-confining disk. A recess is thus provided between the cone-piece and the ball-confining disk in which is placed a washer $e$, of felt or other fibrous material, which acts effectually to prevent entrance of dust to the bearing-surface.

The wall of the bearing recess $a^2$ is curved, as shown, forming an annular corner $a^5$, projecting within the circle of balls, as shown, and in bearings of this kind as heretofore commonly constructed the recess has been so shaped that the distance from the corner $a^5$ to the inner edge of the ball-confining washer was less than the diameter of the balls, so that after the said washer was driven into place the balls were retained in the recess in the hub independently of the inner conical bearing $c$, so that they would not drop out when said conical bearing was removed for cleaning or for any other reason. Such construction necessitates that if the balls or any of them should have to be removed—as, for example, when a ball becomes broken or worn out of shape, so as to need to be replaced—it is necessary to withdraw the confining-disk, which, owing to the fact that it is driven in tightly, is a difficult operation and involves danger of marring or injuring some of the parts.

In the present invention the bearing is so shaped that the corner $a^5$ is at a distance from the inner edge of the confining-disk $a^3$ equal to or slightly greater than the diameter of the balls, so that the latter when confined only by said corner $a^5$ and said disk $a^3$ can be removed from the bearing recess without withdrawing said disk $a^3$ from the hub. In order, however, to prevent such removal of the balls (except when it is required) so as to avoid the inconvenience of having the balls $b$ drop out when the cone $c$ is removed, the hub is in accordance with this invention provided with an internal sleeve $f$, which fits snugly in the bore of the hub adjacent to the ball-recess, but on the opposite side of said recess to that entered by the cone $c$, the said sleeve being preferably a split sheet-metal sleeve that bears frictionally against the inside of the hub by its elasticity, so that it will remain in whatever position it is put until positively moved therefrom, but may be easily moved by the application of moderate pressure. The said sleeve is normally retained in its outward position, as shown, so that its outer edge is at a distance from the inner edge of the confining-disk $a^3$ less than the diameter of the balls, and thus prevents the balls from dropping out when the cone $f$ is removed; but if it is desired to remove the balls from the recess in the hub this can be done by pushing the sleeve $f$ back into the hub sufficiently to release the balls, and after the latter have been replaced the said sleeve is moved out again, so as to properly confine them.

The driving-sprocket is not shown in Fig. 1, as the bearing may be used whether the wheel is the driving-wheel carrying the sprocket or not.

The stationary wheel-spindle $d$ of the wheel that carries the sprocket in the Safety bicycle is secured in a slotted or forked arm $g$, (see Fig. 2,) connected with that portion of the frame-work A of the bicycle that is supported on said rear wheel, and usually the said arm $g$ is clamped between the cone $c$ of the bearing-piece and a clamping-nut $h$, which screws onto the end of the spindle $d$ outside of the arm $g$. The said clamping-nut $h$ is relied upon not only to lock the cone-piece of the bearing in adjusted position on the spindle $b$, but also to retain said spindle in proper position in the arm $g$, which is slotted to permit the said spindle to be moved in the frame, so as to bring the sprocket on the wheel at the proper distance from the co-operating driving-sprocket to maintain the chain at the desired tension. When there is nothing but the grip of the nut to thus hold the spindle in the frame, it is likely to work loose under the strain of the chain, and various devices have been employed for controlling its position in addition to the grip of the nut H.

In the present invention the position of the spindle in the slotted arm $g$ is controlled by cam-washer $k$, pivotally secured to the framework at $k^2$ and provided with a slot $k^3$, eccentric to its pivot $k^2$ and of sufficient width to receive the spindle $d$ within it. The said slot thus crosses or intersects the slot in the arm $g$, the two completely confining the spindle $d$, and as the said washer $k$ is turned about its pivot $k^2$ the position of intersection of its slot with that of the arm $g$ travels along the said slot in the arm $g$, so that it may be made to confine the spindle $d$ at different positions in the slot of the arm $g$. When the spindle $d$ has been moved to the proper position in the slot of the arm $g$ to give the driving-chain the proper tension, the washer $k$ being properly turned during this movement, the nut $h$ is tightened up and thus locks the washer, spindle, and bearing-cone in the desired position, said washer, however, resisting tendency of the spindle to move along the slot in the arm $g^2$, so that the said spindle cannot work loose as easily as is the case when nothing but the grip of the nut $h$ is depended upon to fasten it.

By the employment of the sleeve $f$ it becomes practicable to make the ball-confining disk $a^3$ integral with the hub-piece, if desired, or, in other words, to provide the hub with a groove to receive the balls, which groove is sufficiently wide to permit the balls to be dropped into position, after which they are retained in position by the sleeve $f$.

I claim—

1. The combination of the wheel-hub having a bearing-recess and balls therein with a ball-confining disk inserted in said hub and provided with a rabbet at its outer side and a cone-piece provided with a shoulder, and a washer confined within the rabbet of the ball-confining disk by said shoulder of the cone-piece, substantially as described.

2. The combination of the wheel-hub having a bearing-recess and balls therein with a ball-confining disk tightly held in said hub, and a movable sleeve in said hub co-operating with said disk to retain the balls in said recess or to release them therefrom, substantially as described.

3. The combination of the sprocket-wheel of a bicycle and its bearing-spindle with the frame-work provided with a slotted arm to receive said spindle, and a washer pivoted on the said frame-work and provided with a curved slot which intersects that of the spindle-receiving arm at different points as said washer is turned on its pivot, the said slotted washer embracing the bearing-spindle in its slot and being itself confined between the slotted arm of the frame and a nut on said spindle, substantially as and for the purpose described.

4. The combination of the tubular wheel-hub having the annular bearing-recess near its end and balls therein with the spindle passing through said tubular hub and provided with a bearing-cone entering one side of said ball-recess, and a movable sleeve contained within the hub and adapted to project over the opposite edge of said ball-recess from that entered by the cone, substantially as and for the purpose described.

In testimony whereof I have signed my name to this specification in the presence of two subscribing witnesses.

GEORGE A. BURWELL.

Witnesses:
JOS. P. LIVERMORE,
M. E. HILL.